(12) United States Patent
Suzuki et al.

(10) Patent No.: US 10,445,493 B2
(45) Date of Patent: Oct. 15, 2019

(54) INFORMATION PROCESSING SYSTEM

(71) Applicant: DENSO CORPORATION, Kariya, Aichi-pref. (JP)

(72) Inventors: Hiroki Suzuki, Kariya (JP); Tomohisa Kishigami, Kariya (JP)

(73) Assignee: DENSO CORPORATION, Kariya (JP)

( * ) Notice: Subject to any disclaimer, the term of this patent is extended or adjusted under 35 U.S.C. 154(b) by 202 days.

(21) Appl. No.: 15/459,444

(22) Filed: Mar. 15, 2017

(65) Prior Publication Data

US 2017/0270291 A1 Sep. 21, 2017

(30) Foreign Application Priority Data

Mar. 17, 2016 (JP) .................................. 2016-053920

(51) Int. Cl.
*G06F 21/51* (2013.01)
*B60Q 9/00* (2006.01)

(52) U.S. Cl.
CPC ............... *G06F 21/51* (2013.01); *B60Q 9/00* (2013.01); *G06F 2221/033* (2013.01)

(58) Field of Classification Search
CPC ...... G06F 21/51; G06F 2221/033; B60Q 9/00
See application file for complete search history.

(56) References Cited

U.S. PATENT DOCUMENTS

| | | | | |
|---|---|---|---|---|
| 7,401,234 B2* | 7/2008 | Case | ....................... | G06F 21/57 707/999.009 |
| 7,729,824 B2* | 6/2010 | Tolkacz | ................ | B60R 25/102 701/29.6 |
| 8,600,604 B2* | 12/2013 | Basir | ...................... | G07C 5/008 340/427 |
| 9,031,735 B2* | 5/2015 | Pauli | ...................... | F02D 41/22 701/29.6 |

(Continued)

FOREIGN PATENT DOCUMENTS

| | | |
|---|---|---|
| JP | 2008-143418 A | 6/2008 |
| JP | 2014-138380 A | 7/2014 |
| JP | 2014-151720 A | 8/2014 |

OTHER PUBLICATIONS

Nilsson, Dennis K. and Lei Sun, Tatsuo Nakajima; A Framework for Self-Verification of Firmware Updates over the Air in Vehicle ECUs; IEEE, 2008 (Year: 2008).*

*Primary Examiner* — Chau Le
(74) *Attorney, Agent, or Firm* — Posz Law Group, PLC

(57) ABSTRACT

An information processing system made up of a plurality of controllers in a vehicle has a tamperproof configuration by including, in a specific controller among the plurality of controllers: a starter putting the specific controller among the plurality of controllers in a executable state which enables the specific controller among the plurality of controllers to execute a preset program; a determiner determining, before the specific controller among the plurality of controllers is put in the executable state, whether software (Continued)

that is memorized in a preset memory area and at least includes the preset program is tampered; and an outputter outputting, to one of processing devices outside the vehicle. In such manner, the tampering of the software is quickly detectable while preventing an increase of communication load of a communication network and/or the information processing system.

18 Claims, 4 Drawing Sheets

(56) References Cited

U.S. PATENT DOCUMENTS

| | | | | |
|---|---|---|---|---|
| 2003/0055552 A1* | 3/2003 | Akins | ................... | B60W 50/04 701/114 |
| 2013/0111271 A1* | 5/2013 | Baltes | ..................... | G06F 11/26 714/38.1 |
| 2013/0151111 A1* | 6/2013 | Skelton | .................. | B60R 25/00 701/99 |
| 2014/0075579 A1* | 3/2014 | Baltes | ...................... | G06F 8/61 726/30 |
| 2014/0143839 A1* | 5/2014 | Ricci | ..................... | H04W 12/06 726/4 |
| 2014/0343787 A1* | 11/2014 | Mabuchi | ............... | B60W 50/04 701/31.7 |
| 2017/0149562 A1* | 5/2017 | Takada | .................. | B60R 16/023 |

* cited by examiner

US 10,445,493 B2

INFORMATION PROCESSING SYSTEM

CROSS REFERENCE TO RELATED APPLICATION

The present application is based on and claims the benefit of priority of Japanese Patent Application No. 2016-053920, filed on Mar. 17, 2016, the disclosure of which is incorporated herein by reference.

TECHNICAL FIELD

The present disclosure generally relates to a verification technique for detecting abnormality in a controller of a vehicle.

BACKGROUND INFORMATION

An in-vehicle electronic control unit (ECU) may be prone to hacking, or unauthorized overwriting of a control program, and therefore, needs to be protected, thereby requiring a verification technique for detecting abnormality in a controller of a vehicle. A patent document, JP 2014-138380 A, (patent document 1) discloses a technique for detecting an unjust state of a vehicle by the comparison of ECU verification messages in a verification center that is provided as an outside facility outside of the vehicle, with which a tampering of an ECU by the other ECU is detectable.

However, the above-described technique checks/verifies each of many ECUS that exchange messages at the outside verification center, and therefore is incapable of detecting the unjust state at the moment of tampering. For an immediate detection of the tampering, in other words, the communication with the verification center needs to be more frequently performed, which may increase the communication load.

SUMMARY

It is an object of the present disclosure to provide a technique for quickly detecting a tampering of software in a controller of a vehicle without increasing the communication load.

In an aspect of the present disclosure, an information processing system includes a plurality of controllers in a vehicle, the plurality of controllers including a specific controller, the specific controller including a starter putting the specific controller in an executable state that enables the specific controller to execute a preset program, a preset memory area memorizing a software that includes at least the preset program, a determiner determining, before the specific controller is put in the executable state by the starter, whether the software has been tampered, and an outputter outputting, to at least one of the plurality of controllers other than the specific controller or one of a plurality of information processing devices disposed outside of the vehicle, a preset signal upon the determiner determines that the software has been tampered.

In such configuration, when the tampering of the software of the specific controller is discovered, i.e., is determined, the preset signal is output to at least one of the outside controllers/devices from the specific controller, thereby enabling a detection of the tampering of the software of the specific controller when the specific controller is started. Further, there is no need to communicate with the outside controllers/devices of the specific controller in order to detect the tampering of the software, thereby preventing an increase of the communication load.

Parenthesized numerals in the above simply show one example relationship between claim elements in the claims and concrete components in the embodiment, thereby not limiting a technical scope of the present disclosure.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, one embodiment for implementing the present disclosure is described, with reference to the drawings.

1. Embodiment

[1-1. Configuration]

Figure 1:
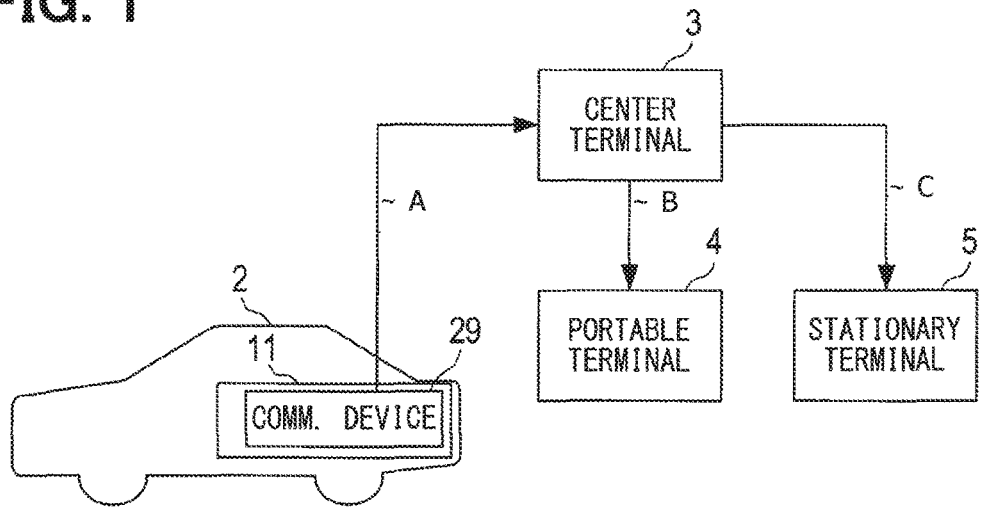
FIG. 1 is a block diagram of an information processing system in an embodiment of the present disclosure.

An information processing system 1 shown in FIG. 1 is a system including an in-vehicle system 11 disposed in a vehicle 2, that is, may include a center terminal 3 installed in an information process center outside of the vehicle 2, a portable terminal 4, and a stationary terminal 5 installed in a preset store. The information process center and the store are only an example of disposed/installed position of those devices, not necessarily limiting the disposed/installed position of the center terminal 3 and the stationary terminal 5.

The center terminal 3 is configured to be capable of communicating with a communication device 29 which is disposed in the in-vehicle system 11 that is mentioned later, the portable terminal 4, and the stationary terminal 5.

The center terminal 3 and the stationary terminal 5 are, respectively, a computer system that has a Central Processing Unit (CPU), a memory, and the like, for providing various functions that are realized by executing a stored program in the memory.

The portable terminal 4 includes a microcomputer, a wireless communication module, a display, a speaker, and the like, and is capable of performing communication with the center terminal 3 through a base station, of displaying image, and of outputting sound/voice.

The center terminal 3 is an example of an information receiver in the claims, and the portable terminal 4 and the stationary terminal 5 are, respectively, an example of a wireless communication terminal in the claims.

Figure 2:
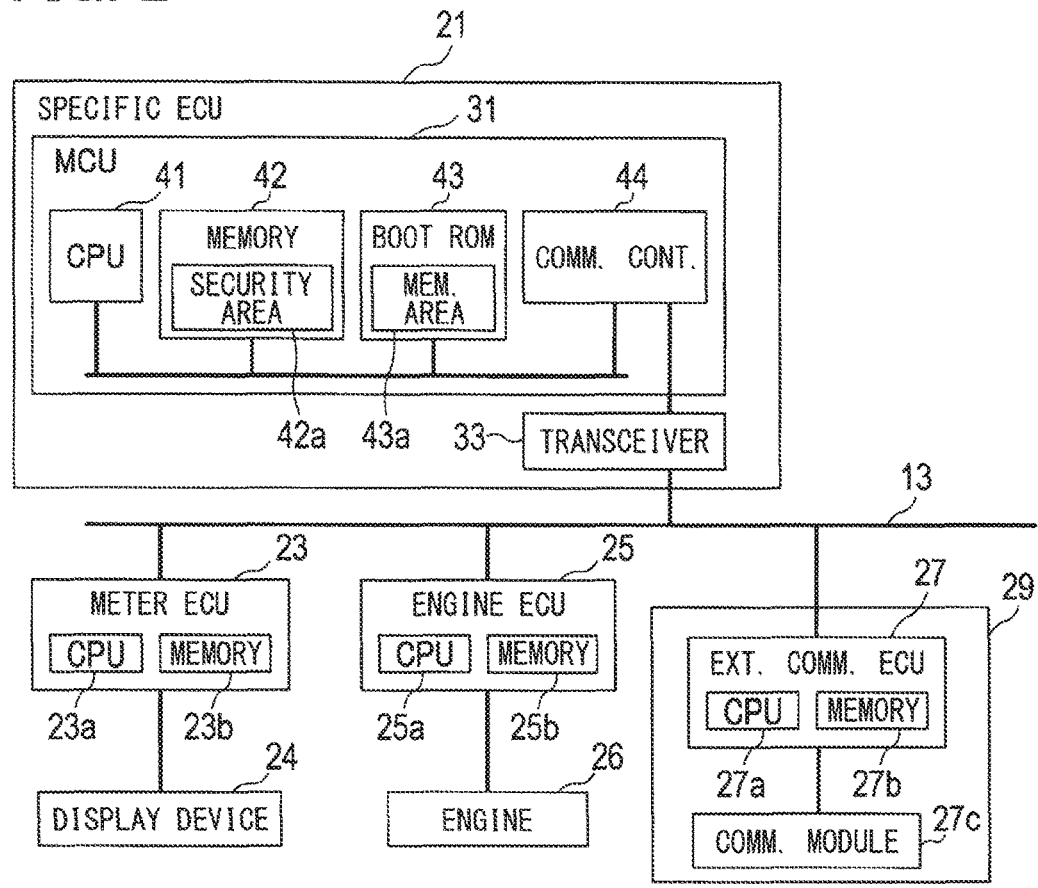
FIG. 2 is a block diagram of an in-vehicle system in the embodiment of the present disclosure.

As shown in FIG. 2, the in-vehicle system 11 has two or more electronic control units (i.e., ECUS) having respectively different functions, and is connected with each other via a communication line 13.

As the ECUS described above may further be defined as a specific ECU 21, a meter ECU 23, an engine ECU 25, an external communication ECU 27, and the like, for example. The external communication ECU 27 serves as a part of the communication device 29.

Two or more ECUS mentioned above are equivalent to a plurality of controllers in the claims, and the specific ECU 21 is equivalent to a specific controller in the claims.

The specific ECU 21 is provided with a micro-controller (henceforth, MCU) 31 and a transceiver 33.

The MCU 31 has, as its main component, a microcomputer that includes, for example, a CPU 41 and a semiconductor memory (i.e., a memory 42 hereafter) such as Random Access Memory (RAM), Read-Only Memory (ROM), and/or a flash memory, and also has a boot ROM 43 and a communication controller 44.

Each of the various functions of the MCU 31 is realized by executing a stored program in a non-transitive and substantive memory medium by the CPU 41. In the present embodiment, the memory 42 is a non-transitive and substantive memory medium for storing a program.

Further, according to the execution of the stored program, a method corresponding to the stored program is performed. The number of the microcomputers disposed in the MCU 31 may be only one or may be more than one.

The function realized by the MCU 31 is not strictly limited. In other words, the specific ECU 21 of the present embodiment serves as an ECU for realizing each of the various functions.

In the following description, a primary function, or primary functions, performed by the MCU 31 are designated as main function(s). The main function is equivalent to a preset function in the claims.

A memory area implemented by the memory 42 may partially be configured as a security area 42*a*, in which the stored program, or "software", is determined as being tampered or not by a boot process mentioned later.

In the security area 42*a*, software, e.g., a program executed in order for the MCU 31 to realize the main function, is memorized. The security area 42*a* is equivalent to a preset memory area.

The tampering of software may be defined as an unauthorized overwriting of data performed via/over the network by a third party, for example.

In a memory area 43*a* that is implemented as the boot ROM 43, a hash value is memorized, for a determination of the tampering of software, e.g., (i) the program or the like, that is first executed at the time of starting of the specific ECU 21, and/or (ii) the software memorized in the security area 42*a*.

Note that the CPU 41 implements a function of each of a starter, a determiner, and an outputting, respectively recited in the claims, by executing the program read out from the boot ROM 43 at the time of starting of the specific ECU 21.

The starter puts the specific ECU 21 in an executable state, which may be defined as a state in which an execution of a preset program is enabled. The program stated above is a program memorized in the security area 42*a*.

The determiner determines whether the software that at least includes the above-mentioned program memorized in the security area 42*a* is tampered, before the starter puts the specific ECU 21 in the executable state. The details about the security area 42*a* are described later.

The outputter is an abnormality notification frame for notifying at least one of the ECUS except the specific ECU 21 about the abnormality of the specific ECU 21, when it is determined by the determiner that the software is tampered. The abnormality notification frame is equivalent to a preset signal in the claim.

Note that the abnormality notification frame includes, for example, vehicle information, Identification (ID) information, version information of the software memorized in the security area 42*a*, time information, and position information. However, the abnormality notification frame does not have to include all of the above. Further, the version information is information of a version of the software before the tampering.

The vehicle information is information for identifying the vehicle 2 in which the specific ECU 21 is disposed. Note that the vehicle information may include one or both of (i) vehicle type identification information for identifying a type of the vehicle 2 and (ii) vehicle identity information for identifying an identity of the vehicle 2, i.e., for identifying an individual vehicle 2.

The ID information is information for identifying an identity of the specific ECU 21, for identifying an individual specific ECU 21.

The time information is information indicative of time of performing a tampering determination by the determiner.

The position information is information for identifying a position of the specific ECU 21, i.e., a position of the vehicle 2, and is, for example, Global Navigation Satellite System (GNSS) information or the like received by using a GNSS antenna (not illustrated).

The communication controller 44 sends out, or transmits, a control signal generated by the CPU 41 to the communication line 13 according to a preset protocol, and receives the control signal from the other ECUS via the communication line 13, and transmits the control signal to the CPU 41.

The transceiver 33 is connected to the communication controller 44 and to the communication line 13, for transmitting an analog signal on the communication line 13 to the communication controller 44 as digital data after analog-digital conversion of the analog signal and for sending out an analog signal to the communication line 13 by converting the digital signal from the communication controller 44 to the analog signal.

The meter ECU 23 controls a display device 24 including an image display area/portion of an instrument panel, an indicator lamp on the instrument panel, and the like, for letting an occupant of the vehicle to recognize a vehicle state, i.e., for notifying a state of the vehicle to an occupant of the vehicle. The display device 24 is equivalent to a warning device in the claims.

The meter ECU 23 has, as its main component, a microcomputer of well-known type, which includes, for example, a CPU 23*a* and a semiconductor memory (i.e., a memory 23*b* hereafter) such as RAM, ROM, and/or a flash memory, and each of the above-described functions is realized by executing a stored program in a non-transitive and substantive memory medium by the CPU 23*a*. In the present embodiment, the memory 23*b* is a non-transitive and substantive memory medium for storing a program.

The engine ECU 25 has a CPU 25*a*, a memory 25*b*, and the like, just like the meter ECU 23, and, a drive control of an engine 26, i.e., a drive device disposed in the vehicle, is realized by the execution of a program by the CPU 25*a*. The engine ECU 25 may be set to a safety control mode, which is a mode different from a normal mode, and, when being set to the safety control mode, the engine ECU 25 performs a different control different from a control in the normal mode. The above-mentioned engine 26 is equivalent to a drive device in the claims.

Note that the vehicle 2 may use a drive device other than the engine, e.g., a motor, and, the engine ECU 25 may control the motor in such case.

The external communication ECU 27 controls a communication module 27c in the communication device 29, with which communication with the center terminal 3 is performed. The communication module 27c may be, for example, a module that is capable of performing wireless communication via a mobile communication network, or may also be a module capable of performing other type of communication. The external communication ECU 27 has a CPU 27a, a memory 27b, and the like, just like the meter ECU 23, and each of the above-described function is realized by the execution of a program by the CPU 27a.

[1-2. Process]

[1-2-1. Process in the Specific ECU 21]

Figure 3:
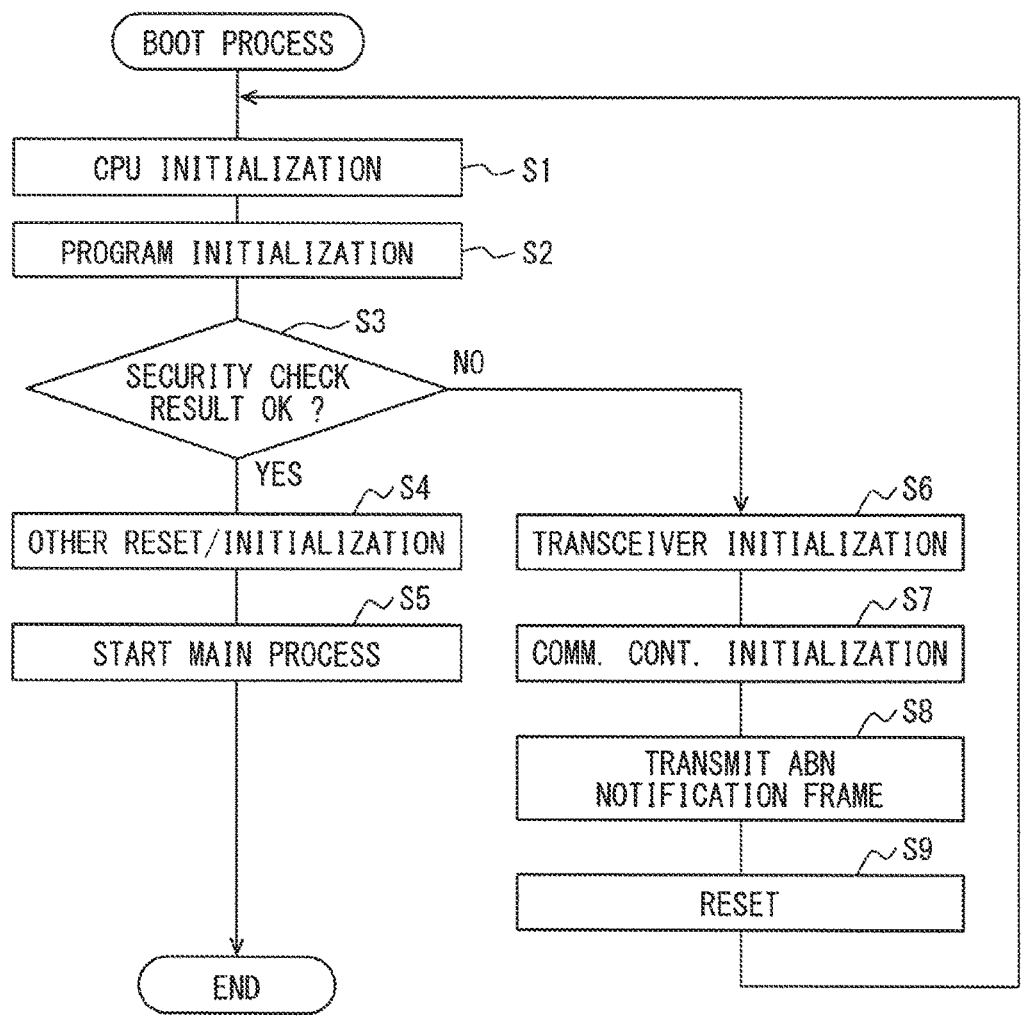
FIG. 3 is a flowchart of a boot process.

The boot process performed by the CPU 41 of the specific ECU 21 is described with reference to a flowchart in FIG. 3. The boot process is started when an accessary switch of a subject vehicle is turned ON and a power supply of the specific ECU 21 is turned ON.

In S1, the CPU 41 initializes itself, i.e., the CPU 41, first. More specifically, a cache, a register, and the like inside the CPU 41 are initialized.

In S2, the CPU 41 initializes a program. That is, the CPU 41 performs setting of an input/output port and an initial output therefrom, and performs an initial value setting and the like.

In S3, the CPU 41 performs a security check, and determines whether a check result is good, i.e., OK. The security check in such case means a check or a determination of whether the software memorized in the security area 42a has been tampered, and the security check is performed by the determiner mentioned above.

The software checked by the security check includes the program and data that is used to execute the program, as well as other matter.

More specifically, the CPU 41 reads a reference hash value from the memory area 43a of the boot ROM 43. The reference hash value is a hash value computed when the program and data which are memorized in the security area 42a are not tampered.

Then, the CPU 41 computes the hash value of the program and the data memorized in the security area 42a, and compares the computed hash value with the reference hash value.

When the computed hash value and the reference hash value are in agreement, i.e., where both the program and data are matching with each other, it is determined that the check result is good/OK, and, when the computed hash value and the reference hash value are not matching with each other, i.e., where at least for one of the program and data do not match, it is determined that the security checked result is not good/OK, i.e., determining that the program or data has been tampered.

When it is determined that the security check result is good/OK in S3, the process proceeds to S4.

On the other hand, when it is not determined that the security check result is good/OK in S3, the process proceeds to S6.

In S4, the CPU 41 performs other reset and/or initialization. In this case, initialization of the specific ECU 21 as a whole other than the CPU 41 is performed.

In S5, the CPU 41 starts a main process for realizing the main function by the specific ECU 21. More specifically, the program memorized in the security area 42a is read and executed. The boot process ends after S5.

In S6, the CPU 41 initializes the transceiver 33. Then, in S7, the CPU 41 initializes the communication controller 44.

By these processes, the specific ECU 21 is put in a communicable state in which communication between the specific ECU 21 and the other ECUS in the vehicle is enabled.

In S8, the CPU 41 outputs the abnormality notification frame on the communication line 13. Thereby, the abnormality notification frame is transmitted to the other ECUS. This process, i.e., an output of the abnormality notification frame, is a process by the outputter, which is recited in the claims.

In S9, the CPU 41 resets the whole ECU, i.e., the specific ECU 21. Then, the process returns to S1. That is, what is a so-called reboot is performed.

[1-2-2. Process in the Meter ECU 23]

Figure 4:
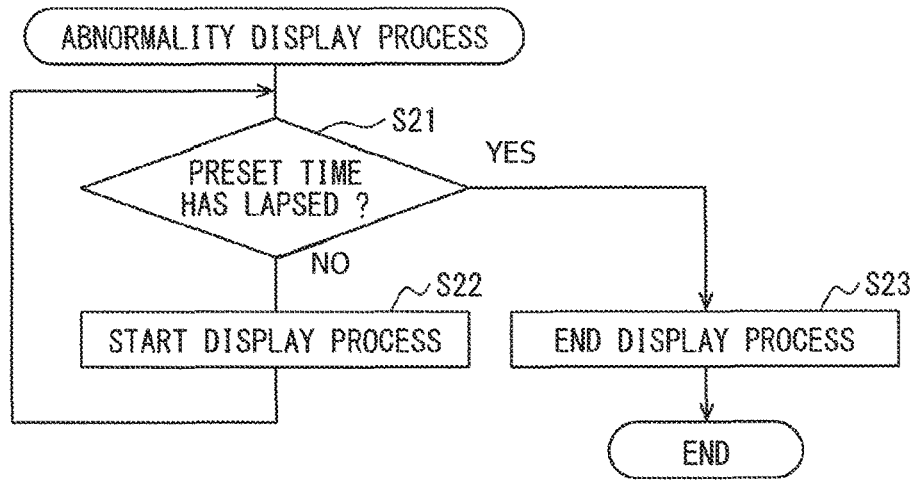
FIG. 4 is a flowchart of an abnormality display process.

An abnormality display process performed by the CPU 23a of the meter ECU 23 is described with reference to a flowchart in FIG. 4.

The process is started when the abnormality notification frame outputted from the specific ECU 21 is firstly received.

That is, in S21, the CPU 23a determines whether a preset time has lapsed after receiving the abnormality notification frame. The preset time in this case is a period of time to display abnormality on the display device 24.

When it is determined in S21 that the preset time has lapsed, the process proceeds to S23.

On the other hand, when it is not determined in S21 that the preset time has lapsed, the process proceeds to S22.

In S22, the CPU 23a performs, i.e., starts, a display process which controls the display device 24 to display abnormality. For example, the CPU 23a turns ON, lights or blinks, a lamp that indicates abnormality, or displays an image that indicates abnormality.

In S23, the CPU 23a ends the display process. That is, the CPU 23a stops the lighting of the lamp of the displaying of the image. The abnormality display process ends after S23.

[1-2-3. Process in the Engine ECU 25]

Figure 5:
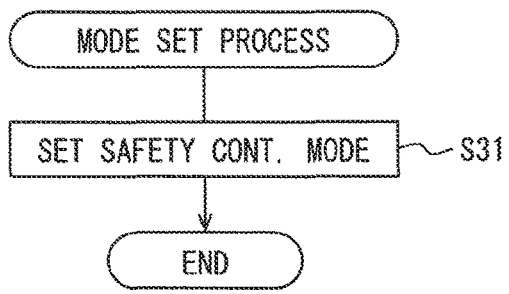
FIG. 5 is a flowchart of a mode set process.

A mode set process performed by the CPU 25a of the engine ECU 25 is described with reference to a flowchart in FIG. 5.

The process is started when the abnormality notification frame outputted from the specific ECU 21 is received by the CPU 25a.

In the mode set process, the CPU 25a sets an operation mode of the engine ECU 25 to a safety control mode in S31. Then, the process ends.

Figure 6:
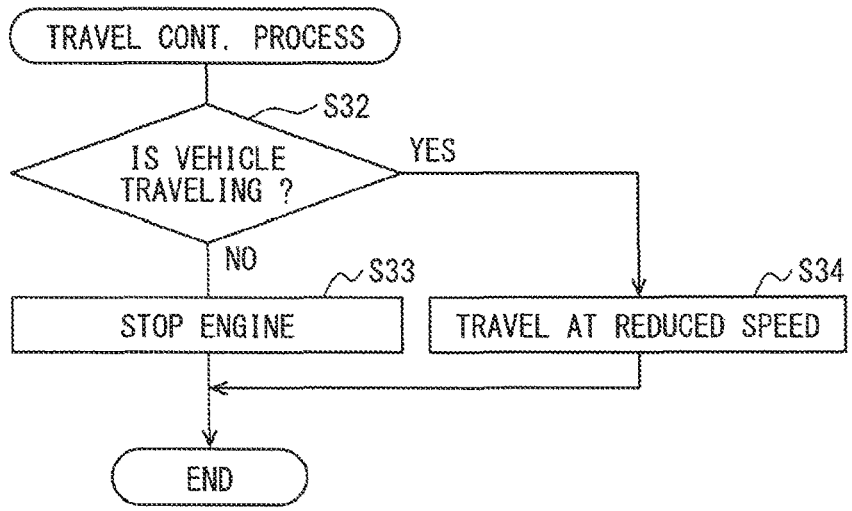
FIG. 6 is a flowchart of a travel control process.

Next, a travel control process performed by the CPU 25a is described with reference to a flowchart in FIG. 6.

The travel control process is started when the operation mode is set to the safety control mode in S31.

In S32, the CPU 25a determines whether the vehicle is traveling. More practically, based on an output of a vehicle speed sensor disposed in the vehicle (not illustrated), it is determined that the vehicle is not traveling when a vehicle speed is 0 km/h, and it is determined that the vehicle is traveling when the vehicle speed is not 0 km/h. Whether or not the vehicle is traveling may also be determined by other method, i.e., based on other factors other than the output of the vehicle speed sensor. For example, it may be determined based on an engine driving state, a change of the position of the vehicle 2, etc.

When it is determined that the vehicle is traveling in S32, the process proceeds to S34. On the other hand, when it is determined that the vehicle is not traveling, the process proceeds to S33.

In S33, the CPU 25a stops the engine. Further, it is set that the starting of the engine will not be performed even when the driver of the vehicle performs an engine start operation.

The process ends after S33.

In S34, the CPU 25a performs a travel at a reduced speed. The travel at a reduced speed means that the travel speed of the vehicle is gradually reduced, finally down to 0 km/h, without acceleration. The process proceeds to S23 after the stop of the vehicle.

The process ends after S34.

Although the control of restricting the drive of the engine is shown in S33 and S34, other control other than the above control may also be performed.

For example, instead of controlling/reducing the travel speed in the above-described manner, the travel speed may be reduced in other manners. More practically, the travel speed of the vehicle may be reduced gradually down to a preset speed, e.g., down to 30 km/h, and then the travel speed thereafter may be set to accelerate only up to the preset speed.

[1-2-4. Process in the External Communication ECU 27]

The CPU 27a of the external communication ECU 27 that is disposed in the communication device 29 transmits a first signal A to the center terminal 3, when the CPU 27a receives the abnormality notification frame outputted from the specific ECU 21.

The first signal A includes the vehicle information, the ID information, the version information of the software memorized in the security area 42a, the time information, and the position information, to be output to the center terminal 3. The first signal A does not need to include all of the above information.

[1-3. Process Performed Outside the Vehicle]

The center terminal 3 perform notification to the portable terminal 4 and notification to the stationary terminal 5, upon receiving the first signal A from the communication device 29.

[1-3-1. Notification to the Portable Terminal 4]

The center terminal 3 transmits a second signal B to the portable terminal 4, upon receiving the first signal A. The center terminal 3 memorizes association of information, i.e., associating identity information of the vehicle 2 with identity information of the portable terminal 4.

When the center terminal 3 receives the first signal A, the portable terminal 4 is identified based on the vehicle information included in the first signal A, and the second signal B mentioned above is transmitted to the portable terminal 4.

The portable terminal 4 displays the abnormality occurred in the specific ECU 21, the need of inspection of the specific ECU 21, and the like in its display area. The information displayed in the display area of the portable terminal 4 is not limited to a specific content.

For example, the displayed information may be a contact address of a service station capable of repairing/fixing the abnormality of the vehicle, or a telephone number of a service center capable of providing a repair guidance.

[1-3-2. Notification to the Stationary Terminal 5]

The center terminal 3 transmits a third signal C to the stationary terminal 5, upon receiving the first signal A.

The stationary terminal 5 is, for example, a terminal disposed in a service facility/station of a vehicle maker, a vehicle sales dealer, a service factory, a road service company and the like.

The center terminal 3 transmits, upon receiving the first signal A, a signal including information that indicates the ID information, the version of the software, etc. to the vehicle maker or to the vehicle sales dealer.

The vehicle maker and/or the vehicle sales dealer may identify the other vehicle, by the individual ID or by type, for example, having the same specific ECU 21 or the same software as the informed one, and may inform/warn and prevent the next attack to the vehicles with the same vulnerability as the informed one. That is, the damage due to the same vulnerability of the ECU/software may be prevented from quickly spreading to the other vehicles.

Further, the center terminal 3 transmits, upon receiving the first signal A, abnormality information about the sender of the first signal A, based on the information in the first signal A indicative of the position of the vehicle, to the nearby service facility of the vehicle sales dealer, of the service factory, or of the road service company. In such case, the stationary terminal 5 may be able to display the abnormality of the specific ECU 21 in the vehicle 2 and/or an inspection request in its display area.

[1-4. Effects]

According to the embodiment described in details above, the following effects are expected.

(1a) When the tampering is discovered in the security check at the time of starting of the operation, the specific ECU 21 sends out the abnormality notification frame to the communication line 13, before performing the reboot.

Therefore, the abnormality of the specific ECU 21 is quickly notifiable to the outside of the specific ECU 21.

Further, upon discovering the abnormality, an abnormality notification is transmitted to the center terminal 3 from the communication device 29, which makes it unnecessary to perform communication for the abnormality detection purposes, thereby reducing the communication load.

(1b) The specific ECU 21 is enabled to perform an accurate security check at the time of starting itself and a tampering detection, by comparing (i) the reference hash value memorized in a non-rewritable ROM and (ii) the computed hash value computed by the software that is memorized in the security area 42a.

(1c) The external communication ECU 27 is enabled to notify the ID information, the version information of software, etc. to the center terminal 3 or to the stationary terminal 5. Therefore, the vehicle having a problem and/or the software having a problem is easily identifiable.

(1d) When the tampering of the specific ECU 21 is detected, the situation is quickly notifiable to the occupant of the vehicle or to the user of the portable terminal 4 from the display device 24 or from the portable terminal 4, quickly making them aware of the situation. As a result, a danger caused by the abnormality of the specific ECU 21 is avoidable in case that the tampering situation is detected during the travel of the vehicle 2, use of the vehicle having abnormality is also avoidable, and repair/inspection of such vehicle is quickly performable.

Other Embodiments

Other embodiments other than the above-mentioned may also be devisable.

(2a) According to the above-mentioned embodiment, when the tampering is discovered in the specific ECU 21, the communication device 29 transmits the first signal A to the center terminal 3, and the center terminal 3 transmits the second signal to the portable terminal 4 and/or to the stationary terminal 5.

Figure 7:
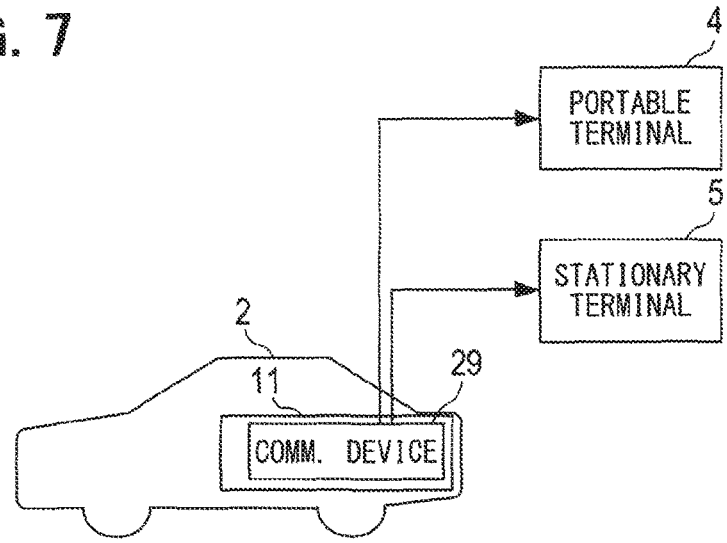
FIG. 7 is a block diagram of the information processing system in another embodiment of the present disclosure.

However, as shown in FIG. 7, without using the center terminal 3, the communication device 29 may be configured to directly transmit a signal to the portable terminal 4 or to the stationary terminal 5.

Further, when performing wireless communications with the portable terminal 4, such wireless communication may be based on a wireless Local Area Network (LAN) standard or based on a short-range wireless communication or the like, instead of using the mobile communication network. Note that, in such configuration, the portable terminal 4 is equivalent to a wireless communication terminal in the claims, and the signal transmitted to the portable terminal 4 from the communication device 29 is equivalent to a specific signal in the claims.

Figure 8:
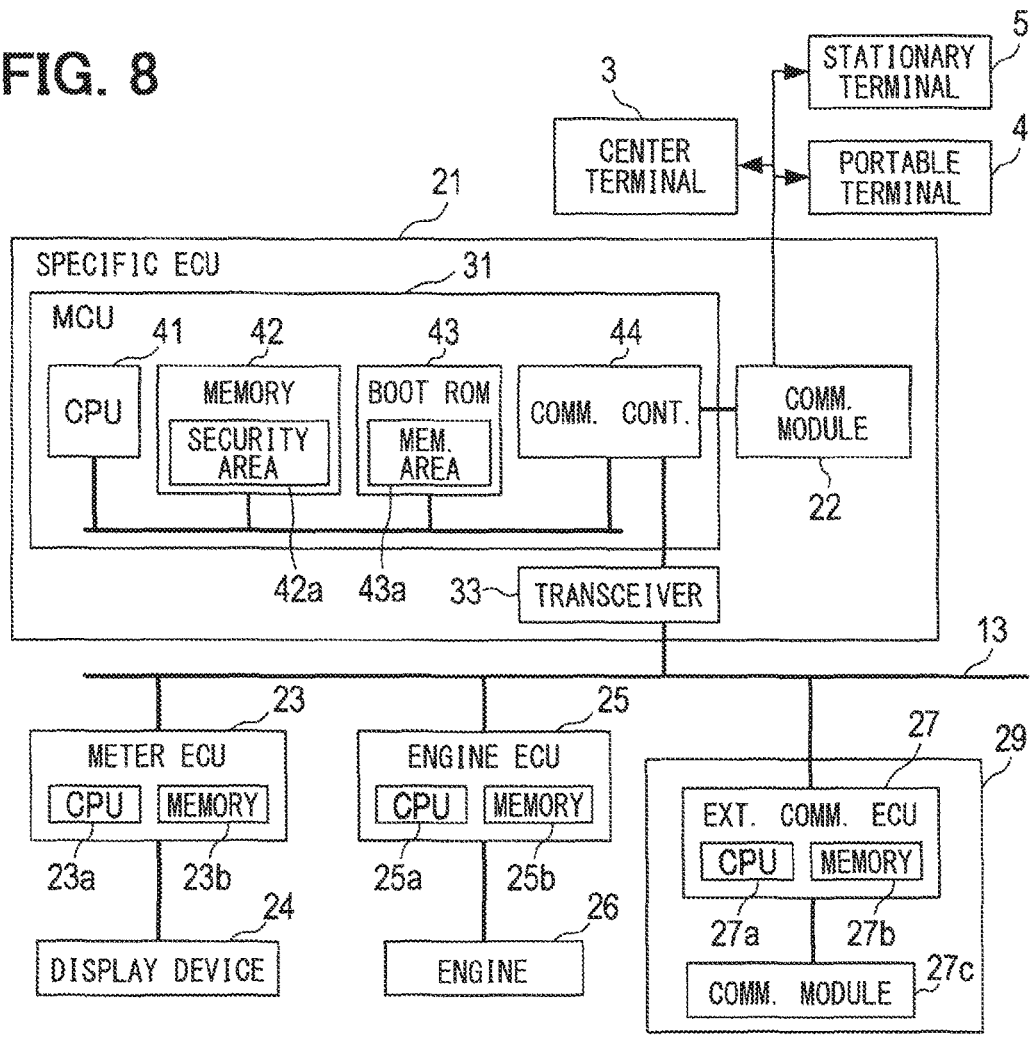
FIG. 8 is a block diagram of the information processing system in yet another embodiment of the present disclosure.

Further, as shown in FIG. 8, the specific ECU 21 may include a communication module 22 of itself, and the outputter may transmit the abnormality notification frame therefrom to the center terminal 3, the portable terminal 4, and the stationary terminal 5, without transmitting information to the communication device 29 within the in-vehicle system 11. Note that, in such configuration in FIG. 8, the center terminal 3, the portable terminal 4, and the stationary terminal 5 are equivalent to an information processing device outside of the vehicle.

Further, note that the portable terminal 4 is configured to perform at least one of the abnormality notification to the user of the portable terminal 4 or an inspection warning, and performs at least one of the abnormality notification or the warning upon receiving the abnormality notification frame.

(2b) According to the above-mentioned embodiment, the software for the MCU 31 that realizes the main function is memorized in the security area 42a, and whether the software has been tampered is determined in such configuration.

However, the MCU 31 needs to perform multi-layered programs for realizing the main function, thereby security check may also be performed for each of the multiple layers of such program.

For example, the starting of firmware and the security check of firmware may be performed by a program memorized by the boot ROM 43, and the starting and the security check of an operating system may be performed by the started firmware.

Further, in the configuration of executing the multi-layered programs, the abnormality notification frame may be output to the communication line 13 by the outputter (i) when the tampering is discovered at a time of starting a program in one of those layers, or (ii) when the tampering is discovered at a time of starting a program in a specific one of those layers.

(2c) According to the above-mentioned embodiment, the abnormality notification frame is notified to the other ECUS of the in-vehicle system 11 by the communication line 13. However, such notification may use a dedicated line dedicated for notification/transmission of the abnormality notification frame, or may be wirelessly transmitted.

(2d) The external communication ECU 27 may be configured to interrupt external communication from outside of the vehicle, when the tampering is detected.

By interrupting the external communication from outside of the vehicle, the attack from outside of the vehicle is prevented, and/or an output of an inappropriate signal from the abnormal ECU is prevented.

(2e) According to the above-mentioned embodiment, when the abnormality notification frame is outputted to the communication line 13, the meter ECU 23 displays the abnormality and the like on the display device 24. However, the warning is provided for the user from a device other than the display device 24 that is under control of the meter ECU 23.

For example, the warning may be provided/output from an image-output device or from a sound-output device in a certain form of an image/sound/voice.

(2f) The function of the specific ECU 21 is not specifically limited. That is, in various kinds of ECU, the above-described configuration is employable. That is, for example, the meter ECU 23, the engine ECU 25, and the external communication ECU 27 may also be configured to perform the same security check and to output the same abnormality notification frame as the specific ECU 21.

(2g) According to the above-mentioned embodiment, when the tampering is detected in the specific ECU 21, the signal is either directly or indirectly transmitted to the other ECUS disposed in the vehicle, or to the center terminal 3, the portable terminal 4, and/or the stationary terminal 5. However, the transmission destination of the signal from the specific ECU 21 is not limited to the above. That is, the signal may be transmitted to various devices and the like that are either in the in-vehicle system 11 or disposed outside of the vehicle 2.

(2h) According to the above-mentioned embodiment, the tampering is detected with reference to the hash values. However, the tampering may be detected by other methods. For example, the tampering may be determined by a method of comparing the checksums.

(2i) A function or functions implemented by one component in the above-mentioned embodiments may be distributed to be implemented by plural components, or a function or functions implemented by plural components in the above-mentioned embodiments may be implemented by a single component.

Further, plural functions owned by plural components may be owned/born by a single component, or a function implemented by using plural components may be borne by a single component.

Further, a part of the configuration of the above-mentioned embodiment may be omitted.

Further, at least a part of the configuration of the above-mentioned embodiment may be added to or replaced with the configuration of the other embodiments described above.

All technical thoughts identified by the language of the claims are implemented by the various forms of the embodiment of the present disclosure.

(2j) The present disclosure may be realizable and implementable as one component in the above-described information processing system 1, i.e., as the specific ECU 21, and as a program for controlling a computer as the specific ECU 21, a non-transitive and substantive memory medium for storing such a program, a method of starting a control device or the like, i.e., in various forms of program/device/method, besides being realized as the specific ECU 21.

Although the present disclosure has been described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. An information processing system comprising:
a plurality of controllers in a vehicle, the plurality of controllers including a specific controller, the specific controller including:
a starter configured to put the specific controller in an executable state that enables the specific controller to execute a preset program;

a preset memory configured to store (i) a software that includes at least the preset program and (ii) a first hash value;

a second memory that is different than the preset memory, the second memory configured to store a second hash value, a determiner configured to, before the specific controller is put in the executable state by the starter, compare the first hash value to the second hash value, and determine that the software has been tampered with when the first hash value does not match the second hash value; and an outputter configured to output a preset signal to (i) at least one of the plurality of controllers other than the specific controller or (ii) one of a plurality of information processing devices disposed outside of the vehicle, in response to the determiner determining that the software has been tampered with.

2. The information processing system of claim 1, wherein the outputter is further configured to output the preset signal to the at least one of the plurality of controllers other than the specific controller by one of:

(i) a communication line that is used for enabling communications among the plurality of controllers;

(ii) a dedicated line that is dedicated to an output of the preset signal; or (iii) wirelessly outputting the preset signal.

3. The information processing system of claim 1, wherein the preset signal that is output by the outputter includes at least one of:

(i) information identifying a type of the vehicle in which the specific controller is disposed, (ii) information identifying the specific controller, (iii) a version of the software stored in the specific controller, (iv) time information, or (v) position information.

4. The information processing system of claim 1, wherein the at least one of the plurality of controllers other than the specific controller is configured to control a warning device to output a warning in response to receiving the preset signal from the outputter, the warning at least one of a visual warning or an audio warning.

5. The information processing system of claim 1, wherein the at least one of the plurality of controllers other than the specific controller is configured to drive a drive device disposed in the vehicle, and wherein the at least one of the plurality of controllers other than the specific controller is further configured to restrict a drive of the drive device in response to receiving the preset signal.

6. The information processing system of claim 1, wherein the at least one of the plurality of controllers other than the specific controller is configured to output information to an information receiver outside the information processing system, and wherein the at least one of the plurality of controllers is further configured to transmit at least one of (i) information identifying the specific controller or (ii) information on a version of the software stored in the specific controller to the information receiver, in response to receiving the preset signal from the outputter.

7. The information processing system of claim 1, wherein the information processing device is configured to output at least one of (i) an abnormality notification indicating an abnormality, or (ii) an inspection notification indicating that an inspection is required, and wherein the information processing device is further configured to output the at least one of the abnormality notification or the inspection notification, in response to receiving the preset signal from the outputter.

8. The information processing system of claim 1, wherein the at least one of the plurality of controllers other than the specific controller is configured (i) to transmit a signal to a wireless communication terminal outside of the information processing system, and (ii) to output a specific signal to the wireless communication terminal, in response to receiving the preset signal from the outputter, the specific signal including information identifying the specific controller, and wherein the wireless communication terminal is configured (i) to output at least one of (a) an abnormality notification indicating an abnormality, or (b) an inspection notification indicating that an inspection is required, and (ii) to output the at least one of the abnormality notification or the inspection notification in response to receiving the specific signal.

9. The information processing system of claim 1, wherein the at least one of the plurality of controllers other than the specific controller is configured to transmit a signal to an information receiver outside of the information processing system, and to output a first signal to the information receiver, the first signal including information that enables identification of the specific controller, in response to receiving the preset signal from the outputter, and wherein the information receiver is configured to transmit a signal to a communication terminal outside of the information processing system, and to transmit a second signal to the communication terminal in response to receiving the first signal, and wherein the communication terminal is configured to output at least one of (a) an abnormality notification indicating an abnormality, or (b) an inspection notification indicating that an inspection is required, in response to receiving the second signal from the information receiver.

10. The information processing system of claim 1, wherein the preset memory is a first memory device and the second memory is a second memory device separate from the first memory device.

11. The information processing system of claim 1, wherein the executable state, into which the starter puts the specific controller after the determiner determines whether the software has been tampered with, realizes a main function of the specific controller.

12. The information processing system of claim 1, wherein the preset signal indicates possible software tampering of the software in the preset memory.

13. The information processing system of claim 1, wherein the preset memory is a first memory device and the second memory is a second memory device separate from the first memory device, the executable state, into which the starter puts the specific controller after the determiner determines whether the software has been tampered with, realizes a main function of the specific controller, the preset signal indicates possible software tampering of the software in the preset memory.

14. An information processing system comprising:
a plurality of controllers in a vehicle, the plurality of controllers including a specific controller, the specific controller including:
   a starter configured to put the specific controller in an executable state that enables the specific controller to execute a preset program;
   a preset memory configured to store a software that includes at least the preset program;
   a determiner configured to determine, before the specific controller is put in the executable state by the starter, whether the software has been tampered with; and
   an outputter configured to output a preset signal to (i) at least one of the plurality of controllers other than the specific controller or (ii) one of a plurality of information processing devices disposed outside the vehicle, in response to the determiner determining that the software has been tampered with, wherein
the at least one of the plurality of controllers other than the specific controller is configured to drive a drive device disposed in the vehicle, and wherein
the at least one of the plurality of controllers other than the specific controller is further configured to restrict a drive of the drive device in response to receiving the preset signal.

15. The information processing system of claim 14, wherein the executable state, into which the starter puts the specific controller after the determiner determines whether the software has been tampered with, realizes a main function of the specific controller.

16. The information processing system of claim 14, wherein the preset signal indicates possible software tampering of the software in the preset memory.

17. The information processing system of claim 14, wherein
   the executable state, into which the starter puts the specific controller after the determiner determines whether the software has been tampered with, realizes a main function of the specific controller,
   the preset signal indicates possible software tampering of the software in the preset memory.

18. An information processing system comprising:
a plurality of controllers in a vehicle, the plurality of controllers including a specific controller, the specific controller is configured to:
put, by a starter, the specific controller in an executable state that enables the specific controller to execute a preset program, wherein the executable state realizes a main function of the specific controller;
store, in a preset memory, a software that includes at least the preset program;
determine, by a determiner, before the specific controller is put in the executable state by the starter, whether the software has been tampered with; and
output, by an outputter, a preset signal to (i) at least one of the plurality of controllers other than the specific controller or (ii) one of a plurality of information processing devices disposed outside the vehicle, in response to the determiner determining that the software has been tampered with, wherein the preset signal indicates possible software tampering of the software in the preset memory,
wherein
the at least one of the plurality of controllers other than the specific controller is configured to drive a drive device disposed in the vehicle, and
the at least one of the plurality of controllers other than the specific controller is further configured to restrict a drive of the drive device in response to receiving the preset signal.

* * * * *